United States Patent [19]
Dreves

[11] 3,834,543
[45] Sept. 10, 1974

[54] MEMBRANE MOUNTING ASSEMBLY AND METHOD
[75] Inventor: Alfred E. Dreves, Scotia, N.Y.
[73] Assignee: General Electric Company, Milwaukee, Wis.
[22] Filed: Sept. 1, 1972
[21] Appl. No.: 285,653

[52] U.S. Cl.................. 210/232, 210/447, 210/469, 210/474, 210/500, 210/541
[51] Int. Cl....................... B01d 31/00, B01d 39/16
[58] Field of Search.......... 210/232, 469, 447, 474, 210/238, 500, 541; 55/16; 350/318

[56]  References Cited
UNITED STATES PATENTS
| | | | |
|---|---|---|---|
| 586,724 | 7/1897 | Edmonds | 210/447 |
| 1,231,356 | 6/1917 | Houge | 210/447 X |
| 3,256,675 | 6/1966 | Robb | 55/16 |
| 3,455,817 | 7/1969 | Modell | 55/16 |
| 3,468,781 | 9/1969 | Lucero | 55/16 |
| 3,552,835 | 1/1971 | Benzies | 350/318 |

*Primary Examiner*—Theodore A. Granger
*Attorney, Agent, or Firm*—James E. Espe, Esq.; Granville M. Pine, Esq.; Edward A. Hedman, Esq.

[57]  ABSTRACT

There is provided a membrane mounting assembly comprising a frame having a membrane-covered central opening and a selectively rupturable border, e.g., perimeter of perforations in the membrane, within the opening. The membrane is mounted on the open end of a hollow cylindrical structure, such as an electrode holder, without tearing and the need to trim any excess, by centering such an assembly over the structure, fixing the membrane to the open end, e.g., by locking in an annular recess with an annular gasket, and tearing the frame and excess membrane away from the structure along the selectively rupturable border.

20 Claims, 5 Drawing Figures

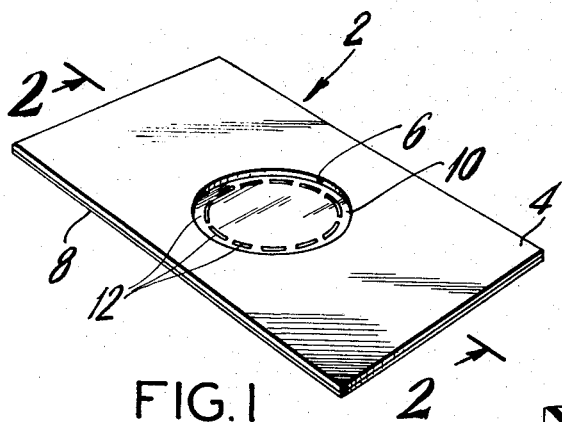
FIG. 1
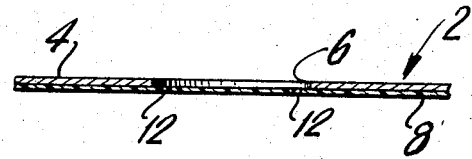
FIG. 2
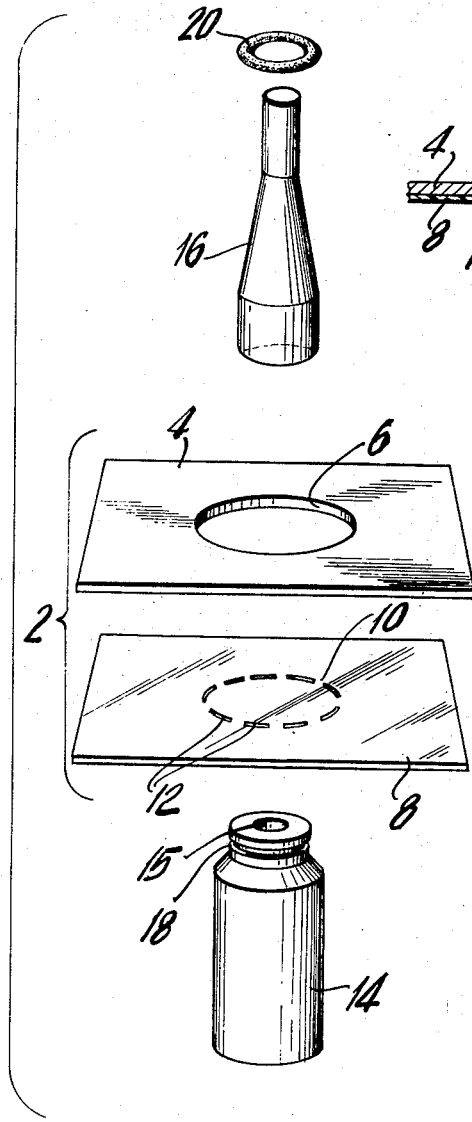
FIG. 3
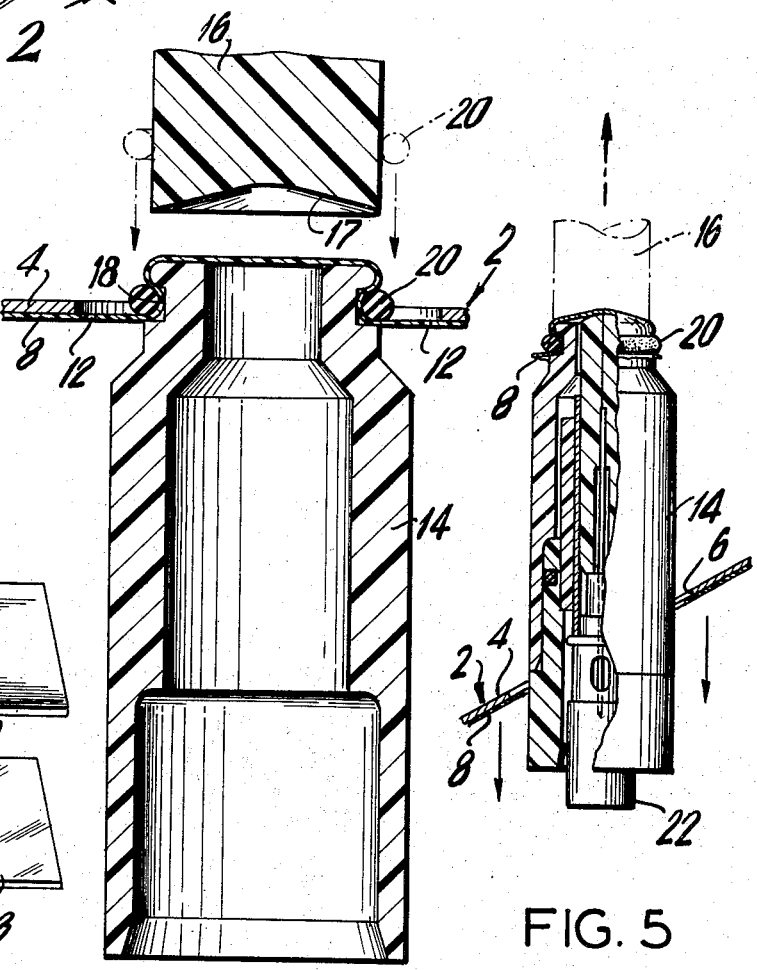
FIG. 4
FIG. 5

MEMBRANE MOUNTING ASSEMBLY AND METHOD

This invention relates to an assembly and method for mounting membranes. More particularly, it provides membranes mounted in a disposable frame which facilitates centering and mounting the fragile material over openings without the need to cut, trim and handle the same.

BACKGROUND OF THE INVENTION

Thin membranes, both metallic and non-metallic, are used to separate gases from liquids, gases from gases, liquids from liquids and the like, when mounted in numerous devices. For example, in heat exchangers, metallic membranes can separate one liquid such as blood, from a second liquid, such as water, acting as a heat source or sink, and permitting the control of temperature by transfer of heat into and out the first liquid through the membrane. On the other hand, other membranes are mounted and used in dialyzers for permitting the transfer of dissolved substances between one medium, such as blood, through the membrane into or out of another medium such as water or saline solution. Thin membranes are also mounted and used in blood oxygenators wherein they function to permit the removal of carbon dioxide from blood flowing on one side of the membrane and replacing the carbon dioxide with oxygen flowing on the other side. An especially useful application of such membranes is in the measurement of acidity-alkalinity, i.e., pH, and dissolved gases, e.g., carbon dioxide and oxygen in fluids. Here, the membranes are used to isolate the sensitive electrode from all components in the system being measured except for particular ones which are pre-selected for analysis, such as hydrogen ion, oxygen, carbon dioxide and the like.

The membranes of the type discussed above, whether they be metallic, e.g., copper, gold, aluminum, stainless steel and the like, or non-metallic, e.g., rubber, regenerated cellulose, silicone, silicone-polycarbonate copolymers, polyolefins, and the like, are all very thin, and fragile, ranging from about 0.01 to about 5 mils in thickness. This makes handling and mounting without tearing very difficult and tedious and requires a high degree of skill. A common way to mount the membranes is to stretch the thin film over the opening to be closed, and after sealing the edges, to cut away the excess membrane with scissors or other means.

In addition to requiring manual dexterity, such techniques have a high scrap rate and a very low production rate.

There has now been discovered a simplified and rapid means to mount thin membranes over openings and there is no need to trim any excess after mounting.

Furthermore, the amount of wasted membrane is substantially reduced because means are provided which can hold substantially less membrane in place during the operation carried out to fix the membrane to the opening being covered.

While this invention is illustrated with reference to mounting a membrane on an electrode holder, e.g. for electrodes used in blood-gas analyzers, and the like, it is to be understood that the same techniques are applicable to mounting in other devices, such as dialyzers, oxygenators heat exchangers, and the like.

DESCRIPTION OF THE DRAWINGS

FIG. 1 is a perspective view of a membrane mounting assembly according to this invention;

FIG. 2 is a cross-section of the assembly of FIG. 1 along line 2—2;

FIG. 3 is an exploded perspective view from bottom to top of a membrane holder, a membrane and frame, and a membrane locking sub-assembly including a mounting tool and gasket;

FIG. 4 is a cross-sectional view in part of a membrane mounting assembly shortly after fixing the membrane in place on the electrode holder; and FIG. 5 illustrates the membrane after mounting on an electrode holder with the excess membrane and frame in the process of being separated and discarded.

DESCRIPTION OF THE INVENTION

According to this invention, there is provided a membrane mounting assembly comprising a frame having a central opening and a membrane supported by the frame and covering the opening, the membrane having a selectively rupturable border within the opening.

The frame can be of any convenient design or shape such as square, rectangular, circular and the like, and the central opening or openings can be the same or different in shape. It is convenient to use a circular central opening if a circular opening is to be enclosed by the membrane after mounting.

The frame can be constructed of any convenient material, such as metal, glass, plastic, paper, cardboard and the like; although, for reasons of economy, a simple, easy to work disposable material such as cardboard is preferred. The frame preferably is substantially planar.

The membrane can be any conventional material used for such purposes in heat exchangers, blood analyzers, fluid oxygenators, dialyzers and the like, either metallic or non-metallic, as described above and, if it is to be mounted on electrode holders, it is preferred to use a membrane of permeable and non-porous material such as polypropylene, a polyorganosiloxane, e.g., dimethylsilicone, or a copolymer of a polyorganosiloxane and an aromatic polycarbonate. These are commercially available from a number of sources and are ordinarily supplied in thickness of from 0.1 to 10 mils, especially 0.5 and 1.0 mils, although 0.01 mil. thicknesses are also available and are handled with exceptional facility according to this invention.

The membrane can be supported by the frame or in a sandwich between frames by mechanical means or preferably with an adhesive seal or by "welding", e.g., by heating to fuse a thermoplastic then cooling, or by solvent welding, and the like.

The "selectively rupturable border" consists of a weakened linear pathway in the membrane running around the perimeter of the opening in the frame and can be either a radiant energy weakened, e.g., by application of a hot die or a beam of electrons, or a chemically weakened e.g., by treatment with an acid or an etchant, tracing or a mechanically weakened pathway, such as an embossed stripe or a row of perforations or slots. For convenience and reproducibility of the tearing force needed to part the membrane from the frame after mounting, it is preferred to provide the selectively rupturable border by perforating the membrane either before or after adhering it to the frame. It is most preferred to design the perforations in the shape of slots and to provide that the unperforated membrane between the slots comprises a minor fraction of the perimeter of the border (or circumference if it is circular).

The perforations can be introduced in any convenient manner, such as by using an air gun or vacuum on a die, but preferably a suitable pressure die is fabricated and the perforations are simply punched into the membrane.

Another feature of this invention is to provide a method for mounting thin membranes on openings without the need to cut away the excess as with scissors and the like, and minimizes tearing and loss as well as the amount of excess membrane to be discarded.

As applied to electrode holders, for example, a membrane is mounted on an open end of a hollow elongated cylindrical structure by: centering a membrane mounting assembly of the above-mentioned type over the open end, it being necessary to have the central opening in the frame and the selectively rupturable border larger than the open end of the hollow, elongated structure; affixing the membrane to the open end of the structure; and then applying sufficient force to the frame to remove it and the excess membrane by tearing the membrane along the selectively rupturable border.

Before tearing away the frame, the membrane can be fixed to the open end of the tube in any convenient manner, e.g., by adhesive, thermal or solvent sealing or by mechanical means. Preferably the tube will be provided with an annular recess peripherally disposed adjacent to the open end and the membrane is mechanically locked into the recess with an annular gasket, such as a stretchable 0-ring.

DESCRIPTION OF THE PREFERRED EMBODIMENTS

Referring to FIGS. 1 and 2, there is illustrated one form of a membrane mounting assembly 2 comprising rectangular frame 4, e.g., of cardboard and the like, having a central opening 6 and a membrane 8, adhered to the frame, e.g., with an adhesive. Within the opening there is provided selectively rupturable border 10, comprising a plurality of individual slots 12 running through the membrane.

In a typical membrane mount assembly, but without limitation to these dimensions, the frame will be a 2 inch by 1¼ inch piece of thick paper with a centered ¾ inch diameter hole and a 0.5 or 1.0 mil thick polypropylene or dimethylsilicone membrane glued to one side of the paper. For the embodiment shown in FIG. 1 a perforating punch which is slightly less than ¾ inch in diameter, having 12 equal segments, 26° wide, as a cutting edge with 12 slots (4° wide) between each cutting segment, is provided. The membrane assembly is perforated with such a punch and this results in a rupturable border of 12 equal sized slots of 0.228 inch with 0.034 inch of uncut membrane between them.

The method of mounting the membrane on electrode holder 14 is shown by reference to FIGS. 3–5.

In FIG. 3, membrane holder 14 is held to upwardly present open end 15. Holder 14 is provided with peripheral annular recess 18 in proximity to open end 15. Membrane mounting assembly 2 having opening 6 and selectively rupturable border 10 is centered over opening 15. The means employed to affix the membrane to holder 14 in this case is an annular gasket in the form of stretchable 0-ring 20, e.g. of rubber, which fits in recess 18 and grips membrane 8 therein.

It is convenient to use holder 16 to facilitate slipping gasket 20 over the membrane and into recess 18. Gasket 20 is slipped over holder 16 which is brought down onto the membrane (conical recess 17 providing clearance over the "live" membrane area and minimizing damage). Then the 0-ring is rolled down the body of holder 16 into recess 18 and stretches, then locks the thin membrane into place (as seen in FIG. 4).

In FIG. 5 (which shows a typical electrode 22 slipped into holder 14) membrane mounting frame 4 and excess membrane 8 is shown partially removed after tearing loose along the selectively rupturable border and after complete removal it is discarded, leaving the usable portion of membrane 8 mounted securely on top of the open end of holder 14.

It is to be understood that other changes may be made in the particular embodiments of the invention in light of the above teachings, but that these will be within the full scope of the invention as defined by the appended claims.

What is claimed is:

1. A membrane mounting assembly comprising a frame having a central opening and a membrane supported by said frame and covering said opening, said membrane having a selectively rupturable border within and adjacent to the edge of said opening, said opening and said border being larger than an opening in a membrane mount coverable by the membrane, the excess portion of the membrane outside the border and said frame being removable after engagement with a membrane mount by rupturing said border.

2. A membrane mounting assembly as defined in claim 1 wherein said selectively rupturable border within and adjacent to the edge of said opening comprises a plurality of perforations in said membrane.

3. A membrane mounting assembly as defined in claim 1 wherein said frame is substantially planar.

4. A membrane mounting assembly as defined in claim 1 wherein said central opening and said selectively rupturable border within and adjacent to the edge of said opening are substantially circular.

5. A membrane mounting assembly as defined in claim 2 wherein said perforations are slots and the unperforated membrane between said slots comprises a minor fraction of the perimeter of said border.

6. A membrane mounting assembly as defined in claim 4 wherein said selectively rupturable border within and adjacent to the edge of said opening comprises a plurality of slots in said membrane and the unperforated membrane between said slots comprises a minor fraction of the circumference of said border.

7. A membrane mounting assembly as defined in claim 1 wherein said membrane is permeable and nonporous.

8. A membrane mounting assembly as defined in claim 7 wherein said membrane comprises polypropylene.

9. A membrane mounting assembly as defined in claim 7 wherein said membrane comprises a polyorganosiloxane.

10. A membrane mounting assembly as defined in claim 7 wherein said membrane comprises a copolymer of a polyorganosiloxane and an aromatic polycarbonate.

11. A method for mounting a thin membrane on an open end of a hollow elongated cylindrical structure comprising placing the membrane on a frame having a central opening larger than the open end of said structure to cover said opening with the membrane; perforating the membrane in a pattern to produce a selectively rupturable border within and adjacent to the edge of said opening, said selectively rupturable border being larger than the open end of said hollow elongated cylindrical structure; placing the membrane supported by the frame over the open end of said hollow elongated structure; and applying sufficient force to said frame to remove it and the excess membrane by tearing the membrane along the selectively rupturable border.

12. A method as defined in claim 11 wherein said hollow elongated cylindrical structure is provided with an annular recess peripherally disposed adjacent said open end and including the step of locking the membrane in said recess by placing an annular gasket in said recess.

13. A method as defined in claim 12 wherein said hollow elongated cylindrical structure is an electrode holder assembly and said annular gasket is a stretchable 0-ring.

14. A method as defined in claim 11 wherein said frame is substantially planar.

15. A method as defined in claim 11 wherein said central opening in the frame in said membrane mounting assembly and the selectively rupturable border are substantially circular.

16. A method as defined in claim 11 wherein the perforations are slots and the unperforated membrane between said slots comprises a minor fraction of the circumference of said border.

17. A method as defined in claim 11 wherein said membrane is permeable and non-porous.

18. A method as defined in claim 17 wherein said membrane is polypropylene.

19. A method as defined in claim 17 wherein said membrane comprises a polyorganosiloxane.

20. A method as defined in claim 17 wherein said membrane comprises a copolymer of a polyorganosiloxane and an aromatic polycarbonate.

* * * * *